United States Patent
Jones

(10) Patent No.: US 6,700,555 B1
(45) Date of Patent: Mar. 2, 2004

(54) OPTICALLY ADDRESSED DIRECT VIEW PHOTO-LUMINESCENT DISPLAY

(75) Inventor: Michael R. Jones, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 239 days.

(21) Appl. No.: 09/923,859

(22) Filed: Aug. 7, 2001

(51) Int. Cl.$^7$ .................................................. G09G 3/30
(52) U.S. Cl. ............................ 345/76; 345/204; 345/81
(58) Field of Search .............................. 345/76, 81, 84, 345/87, 88, 204, 206, 207, 214, 77, 65; 349/22, 24, 25

(56) References Cited

U.S. PATENT DOCUMENTS

| | | | | |
|---|---|---|---|---|
| 5,830,386 A | * | 11/1998 | Nohira et al. ........... | 252/299.61 |
| 5,869,928 A | * | 2/1999 | Liu et al. .................... | 313/495 |
| 6,097,141 A | * | 8/2000 | Jeong et al. ................ | 313/385 |
| 6,290,874 B1 | * | 9/2001 | Picht et al. ............... | 252/301.4 |
| 6,320,639 B1 | * | 11/2001 | Mori et al. .................. | 349/155 |
| 6,333,724 B1 | * | 12/2001 | Taira et al. ..................... | 345/5 |
| 6,441,551 B1 | * | 8/2002 | Abe et al. ................... | 313/503 |

OTHER PUBLICATIONS

R. L. Van Ewyk, I. O'Connor, A. Mosley, A. Cuddy. C. Hilsum, C. Blackburn, J. Griffiths and F. Jones, "Anisotropic flurophors for liquid crystal displays," pp. 155–160, Displays, Oct. 1986.

Andrew P. Davey, Robert G. Howard and Werner J. Blau, "Polarised photoluminescence from oriented polymer liquid crystal films", pp. 417–420, J. Mater. Chem., 1997.

Christoph Weder, Christian Sarwa, Cees Bastiaansen and Paul Smith, "Highly Polarized Luninescence from Oriented Conjugated Polymer/Polyethylene Blend Films", pp. 1035–1039, Advanced Materials 1997, 9, No. 13.

D. J. Broer, R. van Asselt, R.A.W. van Rooij and C.M.R. de Witz. "Photoluminescent liquid crystal displays—Recent developments and trends in Europe", pp. 235–238, IDW '98, J.C. Wittmann, S. Meyer, P. Damman, M. Dosiere and H–W. Schmidt, "Preparation and characterization of side–chain liquid crystalline polymer thin films aligned on PTFE friction–transferred layers" pp. 3545–3550, Polymer vol. 39, No. 15, 1998.

* cited by examiner

*Primary Examiner*—Vijay Shankar
*Assistant Examiner*—Mansour M. Said
(74) *Attorney, Agent, or Firm*—Nathan O. Jensen; Kyle Eppele

(57) ABSTRACT

An optically addressed direct view photo luminescent display having a phosphor panel having multi-color pixelated surface with molecularly aligned materials therein and a printed bar code pixel identifier on an internal side for providing feedback of scanning beam to pixel registration.

16 Claims, 1 Drawing Sheet

OPTICALLY ADDRESSED DIRECT VIEW PHOTO-LUMINESCENT DISPLAY

CROSS-REFERENCE TO RELATED APPLICATION

This application relates to co-pending application entitled "BAR CODE REGISTRATION OF OPTICALLY ADDRESSED PHOTO-LUMINESCENT DISPLAYS" by the same inventor, assigned to the same assignee, and filed on Aug. 6, 2001, which application is incorporated herein in its entirety by this reference.

FIELD OF THE INVENTION

The present invention generally relates to displays, and more particularly relates to direct view photo luminescent displays, and even more particularly relates to methods and systems for improving the image quality of optically addressed photo luminescent direct view displays.

BACKGROUND OF THE INVENTION

For many years, avionics engineers have endeavored to improve the image quality of displays used in aircraft cockpits. In today's air transport jetliners, it is becoming increasingly desirable to have displays which are simultaneously viewable by several members of the flight crew (cross-cockpit viewing). This is often a significant challenge for liquid crystal displays which often have viewing angle limitations. Also, these cockpits frequently experience very high ambient light conditions which increase the brightness requirements for cockpit displays. One display type that has been proposed to address these requirements is the optically addressed direct view photo luminescent display.

While the direct view phosphor panel associated with these displays provides excellent viewing angle and brightness characteristics, they do have several drawbacks. First of all, diffuse reflection off the phosphor panel is often a problem with these displays. Secondly, improper coloration and other problems can occur if the display is excited by a scanned beam of light because it is often difficult to obtain and maintain proper registration between the scanning beam and the display pixels.

Consequently, there exists a need for improved methods and systems for improving display quality in optically addressed direct view photo luminescent displays in an efficient manner.

SUMMARY OF THE INVENTION

It is an object of the present invention to provide a system and method for improving display quality in optically addressed direct view photo luminescent displays in an efficient manner.

It is a feature of the present invention to utilize an anisotropic phosphor panel.

It is an advantage of the present invention to reduce diffuse reflection of ambient light off the phosphor panel.

It is another feature of the present invention to include a bar coded beam registration scheme.

It is an advantage of the present invention to achieve improved efficiency in registering a scanning light beam with discrete pixels in the display.

It is yet another feature of the present invention to include a pixelated multi-color phosphor panel.

It is yet another advantage of the present invention to eliminate the need for a color filter panel and its attendant undesirable brightness attenuation.

The present invention is an apparatus and method for improving the quality of optically addressed direct view photo luminescent displays which are designed to satisfy the aformentioned needs, provide the previously stated objects, include the above-listed features, and achieve the already articulated advantages. The present invention is carried out in a "diffuse reflection-less" manner in a sense that the diffuse reflection of ambient light off an isotropic phosphor panel has been greatly reduced. Additionally, the present invention is carried out in a "misregistration-less" manner in a sense that the misregistration of a scanning light beam with respect to individual display pixels has been greatly reduced. Additionally, the present invention is carried out in a "brightness attenuation-less" manner in a sense that the brightness attenuation associated with a color filter has been eliminated in certain embodiments of the present invention.

Accordingly, the present invention is a system and method for improving the quality of optically addressed direct view photo luminescent displays which include a phosphor material which has a molecular orientation in alignment with a predetermined direction.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
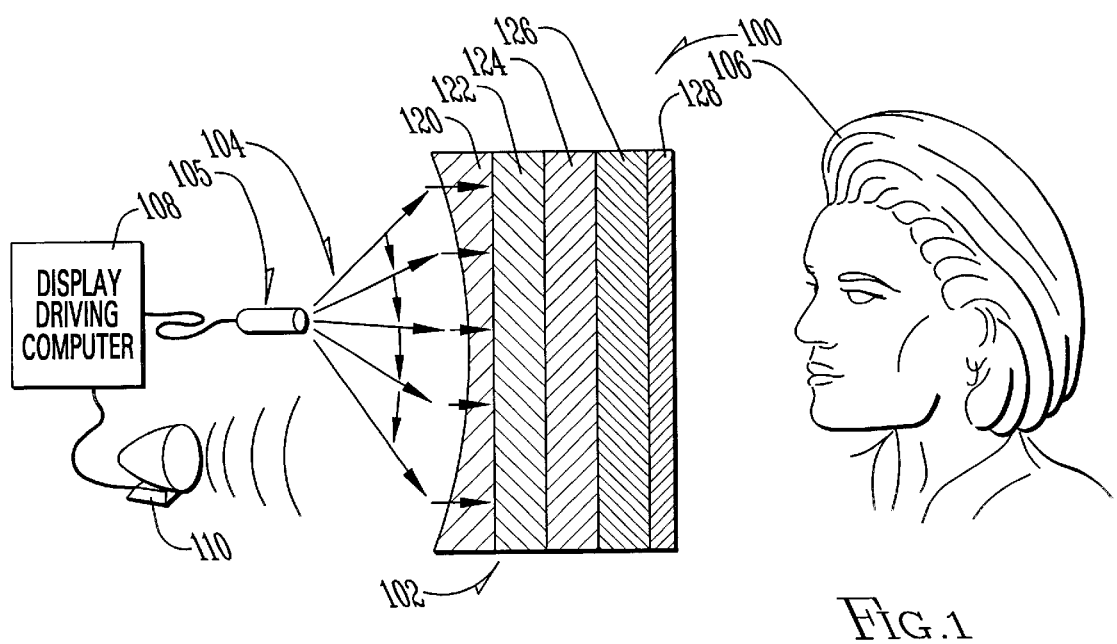
FIG. 1 is a simplified partial cross-section view of a system of the present invention.
Figure 2:
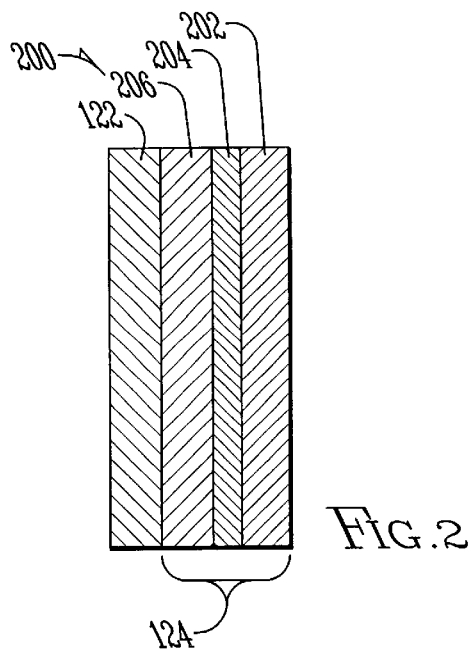
FIG. 2 is an enlarged cross-sectional view of a portion of the display panel of the present invention.

Now referring to the drawings wherein like numerals refer to like matter throughout, and more specifically referring to FIG. 1, there is shown a system of the present invention generally designated 100, which includes a display panel 102, which is shown in more detail in FIG. 2. Also shown in FIG. 1 is scanning light beam 104 which is emitted from light beam source 105, which can be a laser light source or a UV light beam, such as is commercially available from Nichia Chemical Industries, LTD. of Tokushima, Japan. The spectral frequency of scanning light beam 104 is a matter of designer's choice and should be matched to a particular type(s) of phosphors used. Scanning light beam 104 is preferably scanned, using known techniques for scanning beams in optically addressed displays, such as x-y mirrors, acousto-optical modulators and acousto-optical deflectors. It should be understood that the present invention need not be limited to scanning beam type optically addressed displays and may include other optical addressing schemes, such as using a pixelated LCD disposed between the excitation light source and the phosphor to modulate the excitation light incident upon the phosphors.

The purpose of display 100 is to provide a high quality image to viewer 106. To assure that the display being presented resembles the intended image, in a preferred embodiment, the present invention also includes a "scanning beam to pixel" or pixel group registration scheme, which includes a registration feedback photodetector 110 which detects light from scanning light beam 104 which, during the excitation process, is reflected off an array of registration bar codes 122 disposed in the display panel 102. The spectral reflectance of the Registration bar codes 122 is a matter of designer's choice and should be matched to spectral frequency of scanning light beam 104. The level of specular and diffuse reflectance is also a mater of designer's choice. The diffuse reflectance should be large enough (greater than 10%) to produce a detectable signal at the registration feedback photodetector 110. Registration bar codes 122 provide uniquely identifiable reflections from individual pixels or display areas. These uniquely identifiable reflections are captured by registration feedback photodetector 110 and provided to display driving computer 108, where it is used to feed back information relating to the registration of scanning light beam 104. These registration bar codes 122 can be minute bar codes which are printed on the back of phosphor panel 124. Various methods of creating and arranging registration bar codes 122 could be used, depending upon the particular requirements of any application. Whether an individual pixel or merely a display segment is used for registration is a matter of designer's choice as well.

In some applications, it may be preferred to include a lens (refractive or diffractive) 120 which refracts/diffracts the scanning light beam 104, so that it is more collimated as it passes through registration bar codes 122 and the phosphor panel 124.

Phosphor panel 124 may, in a preferred embodiment, be a broad spectrum producing molecularly aligned non-pixelated phosphor material used in conjunction with a pixelated color filter 126. Pixelated color filter 126 may be a filter of the type which is well known in the art of LCDs. If attenuation of the scanning light beam 104 is desired, which may be the case for UV light, a dielectric UV blocking element 128 can be disposed between the phosphor panel 124 and the viewer 106. This dielectric UV blocking element 128 can be an optical bandstop filter or a frequency dependent reflector, both of which are well known in the art. Other well-known means for reducing emission of excitation radiation could be used as well.

In some applications where brightness is critical, it may be desirable to provide a multi-color pixelated phosphor panel 124 which has individual color emissive elements which are individually addressed by the scanning light beam 104. This would eliminate the need for pixelated color filter 126 and its associated brightness attenuation.

Now referring to FIG. 2, there is shown a detailed view of a phosphor panel 124 and registration bar codes 122 combination, generally designated 200. Phosphor panel 124 is shown having a phosphor and reactive mesogen material 202, a molecular alignment layer 204 and a substrate 206. Substrate 206 can be any type of transparent material, such as soda lime glass or other glass, or other transparent sheet material, which is often referred to the display industry as merely "glass". Glass 206 can also be any type of flexible transparent material allowing for curved screens. The molecular alignment layer 204 is preferably a relatively inexpensive organic polyamide agent, such as AL1051, AL3046 or JALS from JSR or SE/7492 from Nissau. Other organic or inorganic alignment layers, such as obliquely deposited SiO or $MgF_2$, are well known in the art for providing molecular alignment of materials used for transparent optical components, such as polarizers and optical compensators.

The manufacturing process involves applying the polyamide alignment layer 204 to the glass 206 and then rubbing the surface to obtain a common alignment of the molecules in the polyamide alignment surface 204. This step of "rubbing" is well known in the LCD prior art Once the polyamide alignment layer 204 is rubbed, the phosphor and reactive mesogen material 202 can be applied to the alignment layer 204 by dissolving the reactive mesogen, the phosphor, and a photo-initiator in a solvent. The solvent is then coated onto the alignment layer 204, dried and then pixelated with a standard UV photolithography process. Rod shaped molecules of the phosphor align with the alignment layer 204. The regions of the film that are exposed to UV radiation through a Photolithographic mask will polymerize creating permanent alignment of the alignment layer 204 and the phosphor 202. The areas that are not exposed can be rinsed away with a solvent. This process can be repeated for red, green, and blue phosphors creating a pixelated film. The resulting highly ordered film generates visible, polarized light when irradiated with UV light. Reactive mesogen material 202 may be used with any well-known broad spectrum organic phosphor type (or narrower band phosphor types when a multi-color pixelated phosphor panel is desired, see below). The preferred reactive mesogen is RM257 from Merk or a suitable substitute.

The process of producing a pixelated multi-color phosphor layer is summarized below:
1. Coat the substrate 206 with the polyamide alignment agent;
2. Rub the surface of the substrate 206 and polyamide alignment layer 204 to produce order;
3. Dissolve a reactive mesogen into a solution of organic fluorescent phosphor (such as triphenylamine); a photo-initiator; photosynthesizing agent and anisotropic absorbing sensitizer (7-diethylamino-4-methylcoumarin) and MEK solvent;
4. Coat the mixture onto the rubbed surface;
5. Polymerize the coating with UV light through a pixelated mask;
6. Remove the coating with a solvent to eliminate the non-exposed (masked) non-polymerized areas;
7. Repeat steps 3–6 with different organic fluorescent phosphor in the solvent solution in step 3. Use a different mask in step 5 to achieve a pixelated RGB photoluminescent thin film with the uniaxial aligned quality.

Throughout this description, reference is made to avionics, because it is believed that the beneficial aspects of the present invention would be most readily apparent when used in an aviation environment; however, it should be understood that the present invention is not intended to be limited to use in such an environment and should be hereby construed to include other non-avionics displays as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:
1. A direct view photo-luminescent display comprising:
a substrate;
a molecular alignment layer disposed on said substrate;
said molecular alignment layer being adapted and configured by rubbing to possess an ordered molecular alignment, where the ordered molecular alignment is uniaxial;
a first phosphor disposed on said molecular alignment layer said phosphor having an elongated rod-shaped molecular structure that is aligned with said ordered molecular alignment of said molecular alignment agent;

a second phosphor disposed adjacent to said first phosphor where said second phosphor has a second narrow band emission; and wherein said first phosphor has a first narrow band emission that is at a different frequency from said second narrow band emission.

2. An apparatus of claim 1 wherein said first phosphor has a broad spectrum emission.

3. An apparatus of claim 1 further comprising:

a third phosphor disposed adjacent to said second phosphor, where said third phosphor has a third narrow band emission that is different from said second narrow band emission.

4. An apparatus of claim 3 wherein said first phosphor, said second phosphor and said third phosphor are arranged in a pixelated pattern.

5. An apparatus of claim 4 wherein said molecular alignment layer is a polyamide.

6. An apparatus of claim 5 wherein said first phosphor is triphenylamine.

7. An apparatus of claim 5 further comprising a scanning light beam to excite a rear side of said substrate when a first side of said substrate is a primary direction of phosphor emissions.

8. An apparatus of claim 7 wherein said scanning light beam is a scanning UV light beam.

9. An apparatus of claim 7 further comprising a plurality of unique reflective identifiers on said rear side of said substrate;

said plurality of unique reflective identifiers being placed, oriented and configured to reflect light incident thereon from said scanning light beam and thereby creating a plurality of identifying reflections.

10. An apparatus of claim 9 further comprising a photodetector adapted and configured to receive the plurality of identifying reflections and provide a registration feedback signal to said scanning light beam.

11. An apparatus of claim 1 further comprising an optical addressing means for exciting a rear side of said substrate when a first side of said substrate is a primary direction of phosphor emissions.

12. An apparatus of claim 11 wherein said optical addressing means is a scanning light beam.

13. An apparatus of claim 12 further comprising a plurality of unique reflective identifiers on said rear side;

said plurality of unique reflective identifiers being placed, oriented and configured to reflect light incident thereon from said scanning light beam and thereby create a plurality of identifying reflections.

14. An apparatus of claim 13 further comprising a photodetector adapted and configured to receive the plurality of identifying reflections and provide a registration feedback signal to said scanning light beam.

15. A method of manufacturing a phosphor display panel comprising the steps of:

coating a substrate with a polyamide alignment agent to create an alignment layer;

rubbing said alignment layer to create a uniaxial molecular alignment therein;

applying a first phosphor and reactive mesogen mixture on said alignment layer;

polymerizing portions of said first phosphor and reactive mesogen mixture by exposing portions of said first phosphor and reactive mesogen mixture to a predetermined radiation using a pixelated mask;

removing non-polymerized portions of said first phosphor and reactive mesogen mixture;

applying a second phosphor and reactive mesogen mixture on said alignment layer;

polymerizing portions of said second phosphor and reactive mesogen mixture by exposing portions of said second phosphor and reactive mesogen mixture to a predetermined radiation using a pixelated mask;

removing non-polyrnerized portions of said second phosphor and reactive mesogen mixture;

applying a third phosphor and reactive mesogen mixture on said alignment layer;

polymerizing portions of said third phosphor and reactive mesogen mixture by exposing portions of said second phosphor and reactive mesogen mixture to a predetermined radiation using a pixelated mask; and removing non-polymerized portions of said third phosphor and reactive mesogen mixture.

16. An optically addressed photo-luminescent display apparatus comprising:

a planar glass substrate having a viewing side and an excitation side;

a polyamide coating disposed in said viewing side, where said polyamide coating has been adapted and configured through a rubbing process to have a uniaxial molecular orientation aligned in a first direction;

a phosphor and reactive mesogen mixture layer disposed on said polyamide coating, said phosphor and reactive mesogen layer having a uniaxial molecular orientation in said first direction;

a plurality of unique light reflecting bar codes disposed on said excitation side;

a scanning UV light beam generator which is responsive to feedback signals relating to reflections from said light reflecting bar codes;

a photodetector disposed on said excitation side which is positioned, adapted and configured to receive said reflections and generate said feedback signals when said scanning UV light beam generator emits a UV light beam which is incident upon said plurality of unique light reflecting bar codes;

a multi-color pixelated color film, and wherein said phosphor and reactive mesogen mixture layer emits a broad spectrum visible emission.

* * * * *